United States Patent [19]

Hanner

[11] 4,348,000
[45] Sep. 7, 1982

[54] DIAL INDICATOR HOLDER

[76] Inventor: Paul J. Hanner, 510 Heckman Ave., Nazareth, Pa. 18064

[21] Appl. No.: 102,855

[22] Filed: Dec. 11, 1979

[51] Int. Cl.³ .............................................. G01B 3/30
[52] U.S. Cl. .................................................. 248/231
[58] Field of Search ................ 248/231, DIG. 4, 230; 33/180 R

[56] References Cited

U.S. PATENT DOCUMENTS

| 2,726,058 | 12/1955 | Foltz | 248/231 |
| 3,631,604 | 1/1972 | Schenavar | 248/231 X |
| 3,664,029 | 5/1972 | Glucoft et al. | 248/231 X |
| 4,216,587 | 8/1980 | Stone | 248/231 X |
| 4,244,111 | 1/1981 | Heard, Sr. | 248/231 |

Primary Examiner—Werner H. Schroeder
Assistant Examiner—Andrew M. Falik
Attorney, Agent, or Firm—Richard L. Miller

[57] ABSTRACT

A "V" block for supporting a dial indicator in a stable position upon a cylindrical motor coupling; the "V" block including a "V" shaped notch for positioning against the cylindrical surface of the coupling, a roller chain adjustably attached to the "V" block for extending around the coupling, and a stem screwed on the "V" block to which the dial indicator is attached.

1 Claim, 6 Drawing Figures

U.S. Patent    Sep. 7, 1982    4,348,000
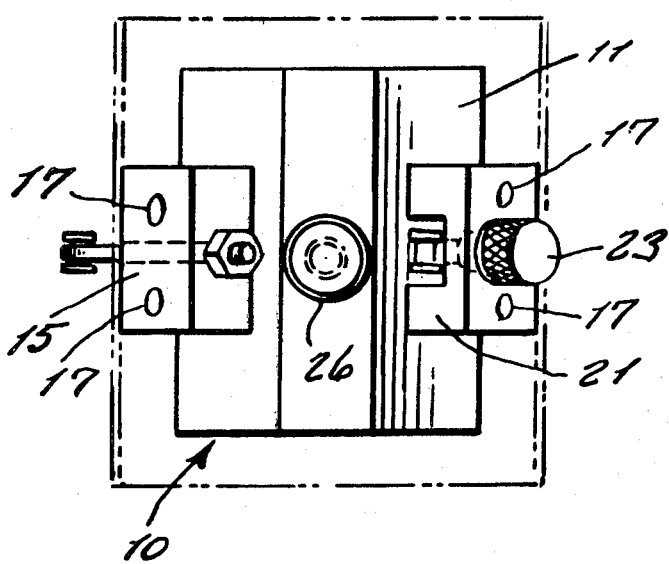
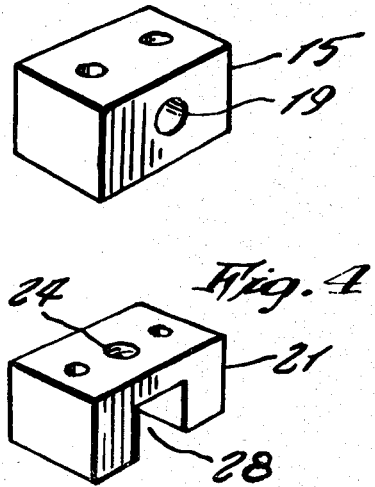
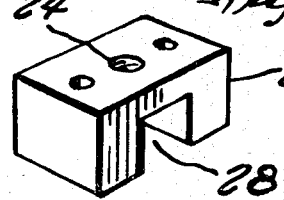
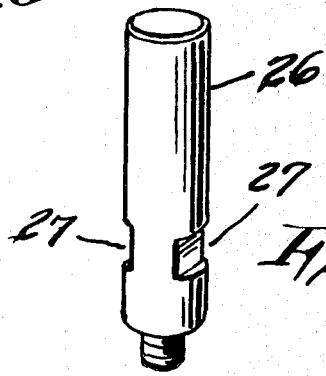
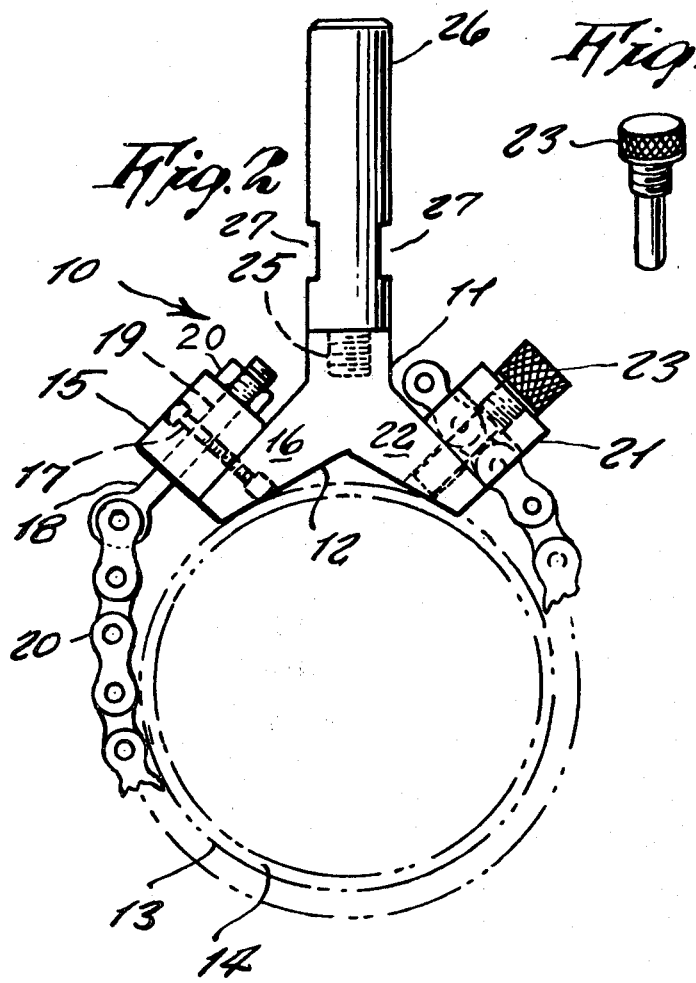

DIAL INDICATOR HOLDER

BACKGROUND OF THE INVENTION

This invention relates generally to "V" blocks. Heretofore it has been difficult to hold a dial indicator in a steady position upon a motor coupling while trying to get an accurate four-position reading of the dial indicator. Various make-shift brackets have been made in the past, for this purpose in order to hold the dial indicator, but their unsteadiness prevented accuracy and there always was the danger of the dial indicator being dropped therefrom.

SUMMARY OF THE INVENTION

Accordingly, it is a principal object of the present invention, to provide a chain compression "V" block dial indicator holder that is designed for the specific task, and which holds the dial indicator holder steadily and securely for accurate reading, while being quick and easy to put on a motor coupling or other cylindrical part and then removed therefrom.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a top view of the invention.
FIG. 2 is a side view thereof.
FIG. 3 is a perspective view of one of the blocks.
FIG. 4 is a perspective view of the other block.
FIG. 5 is a perspective view of the lock screw.
FIG. 6 is a perspective view of the upright post.

DETAILED DESCRIPTION OF PREFERRED EMBODIMENT

Referring now to the drawing in greater detail, the reference numeral 10 represents a chain compression "V" block dial indicator holder according to the present invention wherein there is a cast iron "V" block 11 having a "V" shaped notch 12 on one side for resting against a cylindrical surface 13 of a motor coupling 14.

A first anchor block 15 is secured to one leg 16 of the "V" block by means of a pair of socket head cap screws 17. An eye bolt 18 is inserted through a hole 19 in the anchor block 15, and one end of a roller chain is attached to the eye bolt. An adjusting nut 20 is provided for taking up the slack in chain.

A second anchor block 21 is attached to the other leg 28 of the "V" block by means of a pair of similar socket head cap screws 17. The anchor block 21 includes a transverse notch 22 positioned against the "V" block so as to form a recess into which the other end of the roller chain is received. A single, knurlled head screw 23 is screwed into a threaded hole 24 on the anchor block 21, so as to serve as a set screw that inserts in a hole of the rolled chain and holds the chain securely in the notch so that it cannot pull out.

A threaded hole 25 on the "V" block is located on a side opposite to the "V" shaped notch 12, and a threaded stem 26 is screwed therein, the stem including flats 27 on opposite sides for steady grasp by a tool. The stem supports a dial indicator (not shown).

In use, it is now evident that the device 10 can be readily and firmly attached to a motor coupling so that an accurate four-position reading of the dial indicator is possible.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A chain compression "V" block dial indicator holder comprising, in combination, a "V" block having a first and a second leg, a pair of anchor of anchor blocks attached to said "V" block at said legs thereof, one of said anchor blocks having a pair of holes and a pair of screws for insertion in said pair of holes, and said first leg having a pair of threaded holes for receiving said pair of screws of said one anchor block to thereby attach said one anchor block to said "V" block, said one anchor block also having a longitudinal opening formed therethrough perpendicular to the direction of each of said pair of holes; the other of said pair of anchor blocks having a pair of holes and a pair of screws for insertion into said pair of holes of said other anchor block, said second leg having a pair of threaded holes for receiving therein said pair of screws of said other anchor block, to thereby attach said other anchor block to said "V" block, said other anchor block also having a transverse threaded opening parallel with each of said pair of openings of said other anchor block, and a knurled screw for insertion into said transverse threaded opening, said second leg having a passageway in alignment with said transverse threaded opening of said other anchor block, said passageway passing entirely through said second leg adjacent said other anchor block for receiving therethrough a portion of said knurled screw; a roller chain having a first end for attachment to said one anchor block; an eye bolt having its eye portion thereof affixed to said first end of said roller chain and a second end inserted through said longitudinal opening of said one anchor block, and a nut for tightening said eye bolt to said one anchor block; said chain having a second end remote from said first end and defining therebetween a series of openings between the links of said chain, said knurled screw passing through one of said series of openings of said chain adjacent the second end thereof for holding said chain fast to said other anchor block; said "V" block further comprising an upwardly extending stem removably attached thereto, said stem having a pair of oppositely disposed flat recessed portions for easy gripping by a tool, said stem being used for supporting thereon a dial indicator; and said other anchor block having a notch extending therethrough in a direction parallel with said second leg of said "V" block and perpendicular to said pair of holes of said other anchor block, whereby alignment of a shaft to another shaft may be accurately obtained.

* * * * *